United States Patent [19]

Foster

[11] Patent Number: 4,607,444

[45] Date of Patent: Aug. 26, 1986

[54] PORTABLE ILLUMINATION DISPLAY SIGN

[76] Inventor: C. Tom Foster, P.O. Box 490068, Miami, Fla. 33149-0068

[21] Appl. No.: 681,812

[22] Filed: Dec. 14, 1984

[51] Int. Cl.$^4$ .............................................. G09F 13/28
[52] U.S. Cl. ...................................... 40/550; 40/215; 40/591
[58] Field of Search .......................... 40/550, 215, 591

[56] References Cited

U.S. PATENT DOCUMENTS

| 2,095,350 | 10/1937 | Soule | 40/215 |
|---|---|---|---|
| 3,683,530 | 8/1972 | Robinson | 40/215 |
| 3,763,585 | 10/1973 | Mosch | 40/591 |
| 3,949,503 | 4/1976 | Waress | 40/591 |
| 3,975,849 | 8/1976 | Tuleja | 40/591 |
| 4,033,619 | 7/1977 | Cox | 40/591 |

Primary Examiner—Gene Mancene
Assistant Examiner—Wenceslao J. Contreras
Attorney, Agent, or Firm—John C. Malloy

[57] ABSTRACT

An illuminated sign assembly structured to be portable and thereby usable in a variety of applications such as emergency signalling for distressed vehicles. The sign assembly is formed from a flexible material base capable of being folded upon itself and thereby selectively disposed between an open and closed position. Indicia segments, preferably representing alpha-numerical representations are secured to a display face and accented and distinguished from the remainder of the base through a plurality of illuminating light bulbs arranged in spaced apart arrays which correspond to the configuration of the indicia segments. Electrical circuitry is provided for interconnection of the illuminating light bulbs to one another and to a satisfactory electrical power source such as, but not limited to, the electric battery in a conventional automobile.

12 Claims, 8 Drawing Figures

PORTABLE ILLUMINATION DISPLAY SIGN

BACKGROUND OF THE INVENTION

1. Field of the Invention

This invention relates to a portable display sign including electrically powered illumination means mounted on a flexible material base capable of being folded upon itself so as to be oriented in open, displayed position, or a closed, stored position wherein the display sign may be, but is not limited to, use as an emergency signalling device for a distressed vehicle.

2. Description of the Prior Art

In modernday society display signs are utilized in an extremely wide variety of designs, structures and configurations. Depending on the particular application for which a sign structure is intended it generally includes structural features particularly adapting such sign structure to overcome problems which may be associated with that particular area of application. For example, display or sign assemblies utilized for emergency use to indicate a distressed automobile or any nonoperative or malfunctioning vehicle are plentiful in the prior art. The vast majority of these prior art structures attempt to overcome what are recognized as general problems associated with emergency signs. Typically such display assemblies are capable of being mounted at some prescribed location on an automobile (or any other vehicle) in a manner so as to display a message indicating an emergency or distress situation of the vehicle or occupants thereof. The primary purpose of this type of display assembly is to draw attention to the disabled vehicle for the purpose of receiving assistance in repair of the vehicle or its relocation to an area of safety. However, it is also recognized that such emergency display signs must be relatively compact so as to be stored in the vehicle without taking up excess space and yet should be large enough or otherwise structured to draw attention to the disabled vehicle when displayed as intended.

As set forth above, sign structures of this type existing in the prior art are plentiful and the following United States patents disclose such sign structures which are provided herein to be representative only of such structures: Dexter, U.S. Pat. No. 3,797,151; Mosch, U.S. Pat. No. 4,021,948; Seth, U.S. Pat. No. 4,192,090; Alsup, U.S. Pat. No. 3,772,811; Mosch, U.S. Pat. Nos. 3,594,938 and 4,044,482; Waress, U.S. Pat. No. 3,949,503; Brooks, U.S. Pat. No. 4,070,775; and May, U.S. Pat. No. 3,922,998.

While the structures disclosed in the above set forth patents are certainly considered to be functional for the application intended, it is generally acknowledged that such sign structures are less than efficient in calling attention to the disabled vehicle. This is generally true unless they include what may be considered a sophiscated or complicated structural assembly, possibly with the inclusion of illumination means to enhance visual observation thereof especially during the evening hours when notice of such signs becomes more difficult. However, to date, the combination of portable, illuminated sign structures easily viewable at night or in out of the way locations but still capable of being mounted on a distressed vehicle were considered to be too expensive for widespread commercial acceptance or too complicated for continued use in what may be considered harsh environmental conditions.

Accordingly, there is a need in the sign and or transportation industry for a portable, illuminated display sign which is capable of being utilized as an emergency signalling apparatus for automobiles as well as other vehicles such a marine craft or downed aircraft. Such a preferred structure should be of lightweight but durable construction, having self-illuminating capabilities so as to be readily viewable at night as well as out of the way locations and yet be commercially available at a price which would be popular with the consuming public.

SUMMARY OF THE INVENTION

The present invention is directed towards a display sign assembly specifically structured to be portable and including illumination means to enhance the visual observation of the message or like representation being displayed even during the evening or night time hours. More specifically, the subject assembly comprises a base formed from a flexible material capable of being rolled or folded upon itself such that the assembly may be selectively oriented in either a closed, stored position or an open, displayed position.

The base comprises opposing side panels interconnected to one another but spaced apart to at least partially define a hollow interior portion. A circuit means is disposed at least partially within the interior portion of the base and is structured to electrically interconnect an illumination means with a conventional electrical power source.

The base comprises a display face having indicia formed thereon as by silk screening or any other like technique which affixes or otherwise forms indicia segments. These segments preferably comprise alphanumerical representation in a manner which is visually discernible from a reasonable distance with the naked eye. Further such indicia means may be made of fluorescent or other material which is clearly distinguishable from the remaining exposed surface of the display face.

The subject display sign assembly further includes illumination means preferably in the form of a plurality of light bulbs. The illumination means however is divided into illumination segments, wherein each segment includes a number of the plurality of light bulbs oriented in a configuration which corresponds to an indicia segment on the display face of the base. Such indicia segments could be a letter or number and in such instances the plurality of light bulbs comprising an array would be mounted so as to be viewable from the display face and positioned to outline the individual letters or numbers defining the message on the display face. Each of the letters or numbers would therefore be clearly outlined in illumination and therefore much more noticeable after sunset or from out of the way or partially obscured locations from a much greater distance. Attention would be readily drawn to the display assembly and therefore to any distressed vehicle on which it is mounted. The actual size of the base as well as the remaining components of the assembly may of course vary such that the sign structure could be used in emergency situations for a downed aircraft or a disabled marine craft and thereby be viewable from the air by search aircraft. The subject sign assembly would be effectively self contained to the extent of including circuit means serving to electrically interconnect the plurality of light bulbs and the various arrays with a power source such as a storage battery or the like normally contained in the vehicle.

The flexibility of the material from which the base is formed allows it to be rolled or preferably folded upon itself into a closed or stored position. When in said closed position the plurality of bulbs are disposed in spaced relation to one another so as to be aligned in a somewhat adjacent and nesting orientation relative to light bulbs mounted on adjacent portions of the display face when such adjacent portions are folded upon one another so as to be overlying or essentially abutting one another.

Connecting means are secured to the base and specifically structured to facilitate mounting or hanging of the display sign in its open or displayed position at various locations on any one of a number of vehicles including automobiles, boats, airplanes, helicopters, etc.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be made to the following detailed description taken in connection with the accompanying drawings in which.

Like reference characters refer to like parts throughout the several views of the drawings.

DETAILED DESCRIPTION OF THE PREFERRED EMBODIMENT

Figure 1:
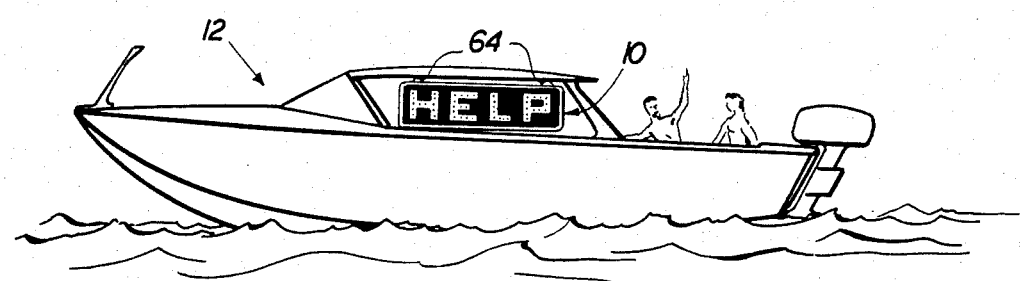
FIG. 1 is a side elevational view showing the sign assembly of the present invention mounted on a marine craft.
Figure 2:
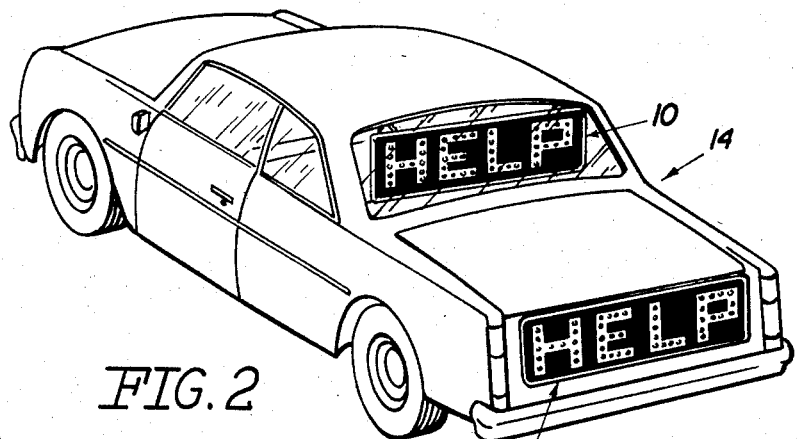
FIG. 2 is an isometric view showing mounting of the sign assembly of the present invention both inside and outside of an automobile.
Figure 3:
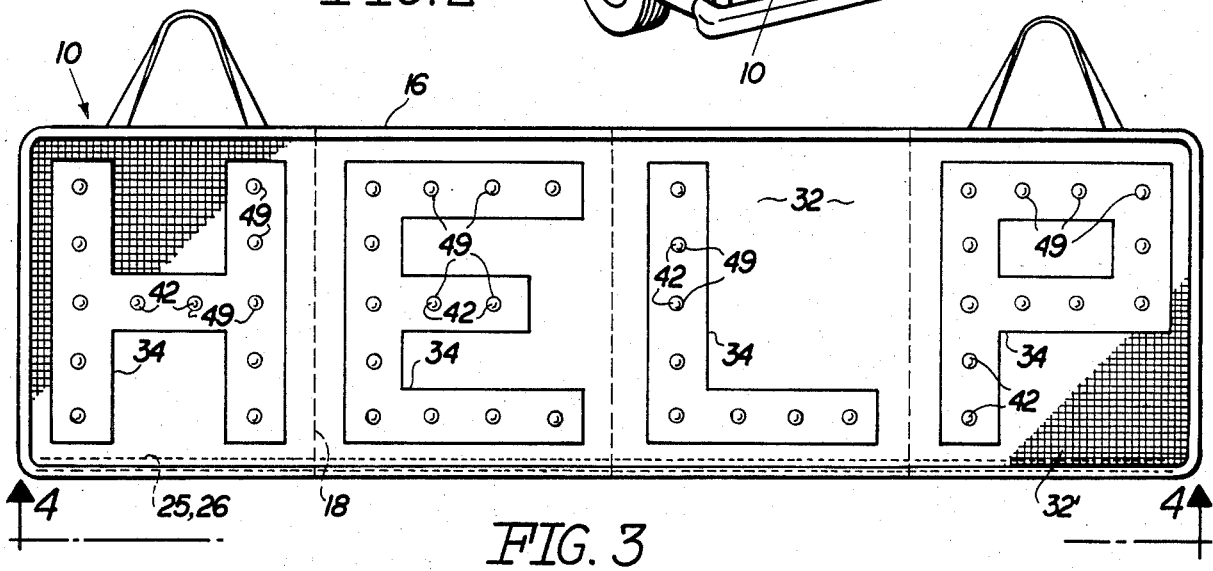
FIG. 3 is a front elevational view of the display face of the subject sign assembly with indicia and the illumination assembly disposed for visual observation thereon.
Figure 4:
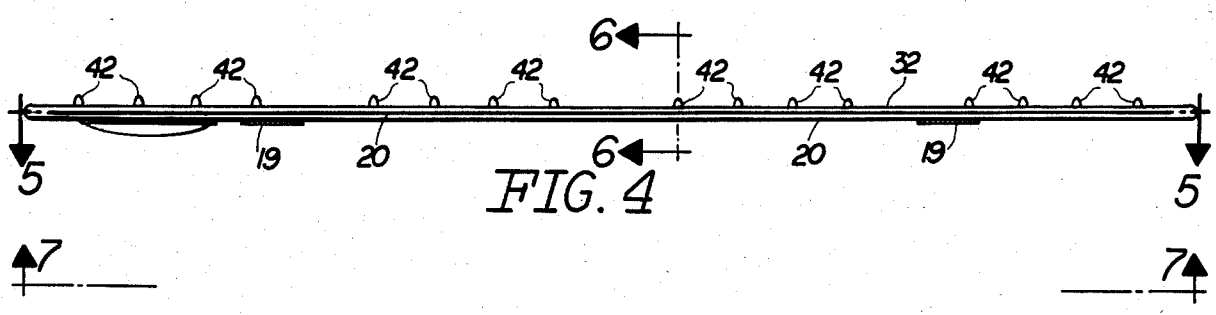
FIG. 4 is a side view along line 4—4 of FIG. 3.

With reference to FIGS. 1, 2 and 3 the illuminated sign assembly of the present invention is generally indicated as 10 and is particularly structured to be mounted for visual display on any type of vehicle including marine craft 12 or automobile 14 such as when such vehicles are in an emergency or distressed situation. More specifically, as best seen in FIG. 2, the illuminated sign assembly may be mounted either inside or outside of an automobile vehicle. Locating the assembly 10 inside the vehicle has the added safety feature of not forcing the occupants to leave the relative safety of the interior of the vehicle, such as when stranded at a remote or undesirable location.

Figure 5:
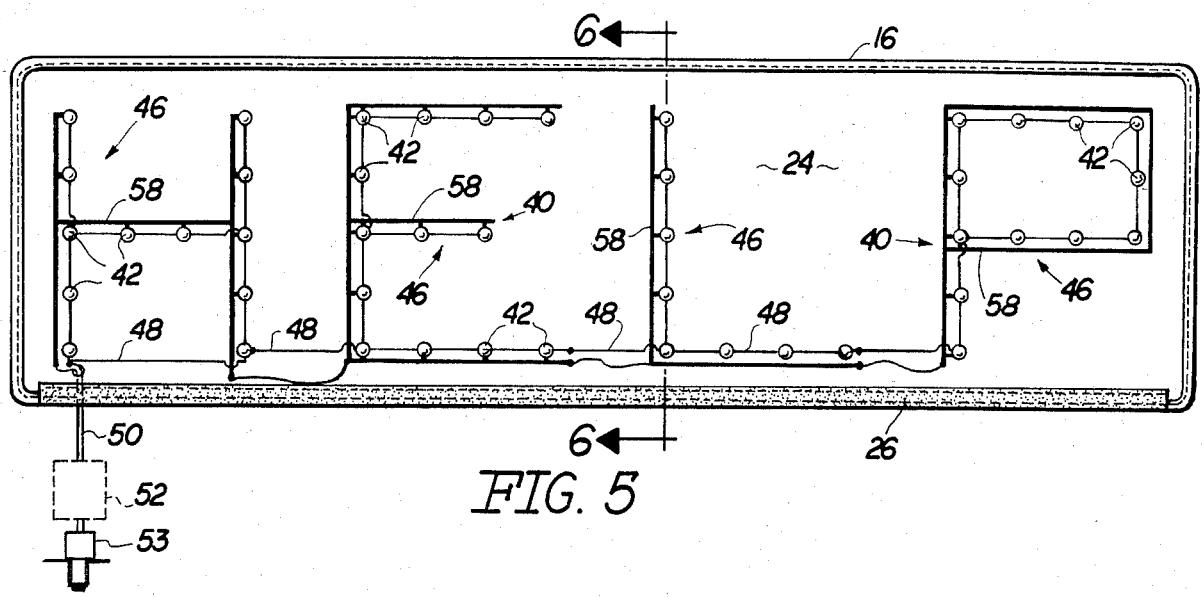
FIG. 5 is a detailed view showing the interior of the base of the sign assembly as viewed along line 5—5 of FIG. 4.
Figure 6:
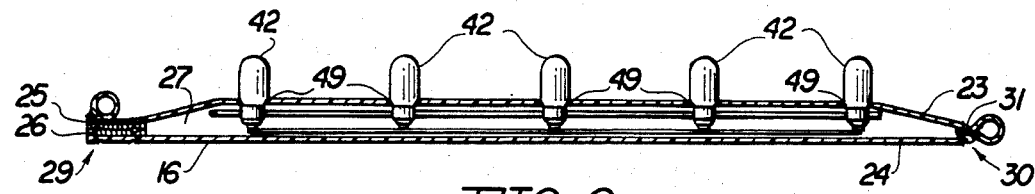
FIG. 6 is a sectional view along line 6—6 of FIG. 5.
Figure 7:
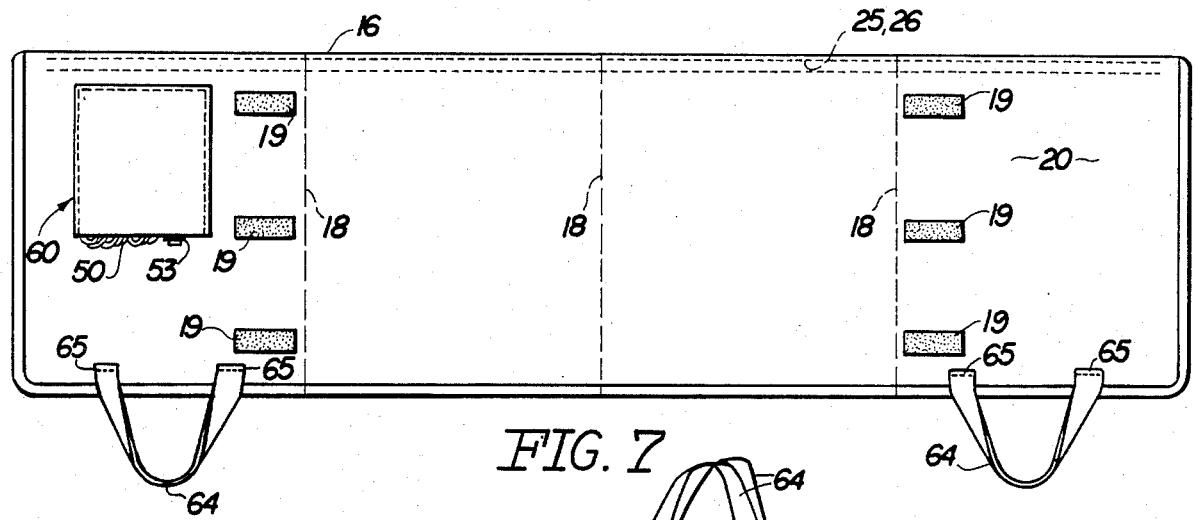
FIG. 7 is a rear elevational view along line 7—7 of FIG. 4.
Figure 8:
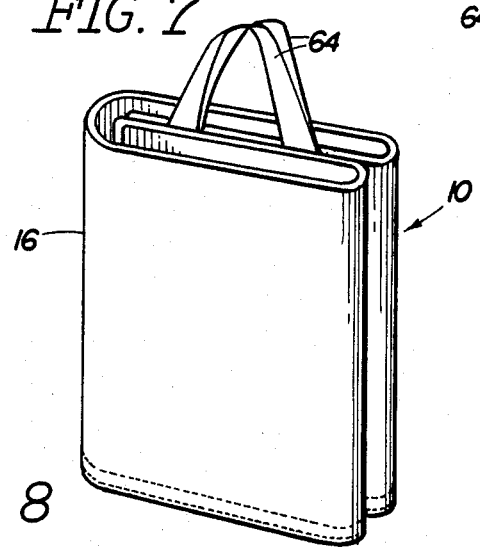
FIG. 8 is an isometric view of the subject sign assembly shown in stored or closed position.

With reference to FIGS. 3 through 8, the sign assembly 10 comprises a base 16 formed of flexible material capable of being folded upon itself between an open displayed position as represented in FIG. 3 and a substantially closed or stored position as represented in FIG. 8. When stored or oriented in the closed position as shown in FIG. 8 the base 16 is folded upon itself preferably along transversely oriented and imaginary fold lines 18 until it is disposed in the orientation of FIG. 8. Closure means are provided to maintain the base 16 in the closed position and may take the form of hook and loop type fasteners, adhesive patches or other connector elements 19. These connector elements are correspondingly positioned with one another on the rear surface 20 (see FIG. 7) so that they will be brought into releasable but mating engagement with one another. The closure means of the present invention is further provided on oppositely disposed longitudinal and peripheral edges of front and rear panels 23 and 24. Such elongated closure elements are represented as 25 and 26 and also may take the form of conventional hook and loop type fasteners which are easily detached from one another so as to provide access into the interior 27 of base 16 as at 29. Accordingly, the access means providing access to the interior 27 of the base 16 is provided by separating the connector elements 25 and 26 along one peripheral edge 29 between oppositely disposed front and rear panels 23 and 24. The opposite longitudinal peripheral edge as at 30 is fixedly secured as by stitching or the like 31. With reference to FIGS. 3, 5 and 6 the base 16 includes display face 32 formed on the exterior exposed surface of front panel 23 and includes indicia means formed thereon as by silk screen or any other applicable method. The indicia means preferably comprises a plurality of indicia segments 34 defining alpha-numerical representations for the like to indicate or signal a given emergency or like (advertising) message clearly visually observable when viewing the display face 32. In addition, each of the indicia segments 34 are formed from a visually discernible and distinctive coloring and or material relative to the remainder of the display face 32 as at 32'. One embodiment includes the indicia segments 34 being formed from a fluorescent material of white or light color and the remainder of the display face 32' being a darkened or black material as indicated in FIG. 3.

An important feature of the present invention is the fact that the sign assembly 10 is obviously structured to be portable and used in a variety of applications as indicated in FIGS. 1 and 2. However a distinguishing feature of the present invention is the ability of the sign assembly 10 to be illuminated thereby including an illumination means generally indicated as 40 in FIG. 5. Self-contained illumination capabilities allows the sign and disabled vehicle to be readily viewable even from remote locations where artificial light is not available for the reflecting of flourescent material commonly used on prior art signs of this type. Such illumination means comprises a plurality of light bulbs 42 werein the plurality of bulbs 42 are arranged into illumination segments. Each segment in turn is defined by a plurality of such light bulbs 42 disposed in a particular array having a configuration corresponding to one of the indicia segments 34 defining an alpha-numerical display as shown in FIGS. 3 and 5. The illumination segments 46 are electrically powered through interconnection to one another and to the light bulbs comprising the individual illumination segments 46 by means of circuitry. The circuitry includes interconnecting conductors 48 serving to electrically interconnect each of the bulbs 42 with a plug element 49. The plug element 49 may be of a variety of structures and configurations but in the embodiment of FIG. 5 is specifically structured for interconnection with a cigarette lighter assembly or facilities found in a common vehicle such as automobile 14. An additional conductor length 50 serves to electrically interconnect the various illumination segments 46 with the plug 49. In addition, an electrical component 52 commonly known as a "flasher" may be inserted within the circuitry as indicated to allow the light bulbs 42 to continuously flash on and off for the purpose of calling attention to the message and/or display disposed on the display face 32. With reference to FIGS. 3 and 6 the display face 32 includes a plurality of apertures 49 integrally formed in the display face 32 and front panel 23. Each of the apertures 49 are formed in registry with one of the indicia segments 34 such that light bulbs 42 protrude through such apertures and are visible from the display face 32 in an orientation or array which clearly accentuates the individual indicia segments 34.

The illumination means further include mounting means in the form of semi-rigid material strips or bracing elements 58 formed from conductive material and serving to mount as well as electrically interconnect each of the bulbs 42 to the circuitry in general and particularly the conductor 48. Accordingly the light bulbs 42 are arranged in parallel circuitry with interconnection to the plug 53 and the power source which, as set forth above, may be part of the individual vehicle 12 or 14. Each of the mounting braces 58 includes a configuration which generally conforms to the individual indicia segments 34 or more particularly the alpha-numerical displays which such indicia segments 34 represent. The mounting braces 58 may therefore be considered both part of the illumination means as set forth above and part of the circuitry means since such parallel circuitry conditions are established between each of the bulbs 42 and the connecting power take-off plug 53 through conductors 48 and 50. As clearly shown in FIGS. 5 and 6, the circuitry means and the individual light bulbs 42 as well as the mounting braces 58 and illumination segments 46 are all mounted, at least in part, on the interior 27 of the base 16 between front and rear panels 23 and 24. Access for insertion, repair and/or replacement of the various components may occur through access means 29 defined by the connector elements or strips 25 and 26 as set forth above.

Other structural features of the present invention include a storage compartment 60 preferably mounted on the rear surface 20 of the rear panel 24 wherein the compartment 60 is provided for storage of the additional conductor 50 disposed exteriorly of the hollow interior portion 27 as well as the plug 53 and any other logical components included in the aforementioned circuitry.

In addition, connecting means may take the form of one or more handles 64 fixedly attached as at 65 to the base 16. The handles 64 are disposed in cooperative relation to one another so as to be oriented in the position shown in FIG. 8 when the sign assembly is stored so as to facilitate carrying such stored sign assembly. When in the open or displayed position, the handle members 64 can be used to hang or mount the sign assembly 10 in a preferred position for visual observation.

It is therefore to be understood that the following claims are intended to cover all of the generic and specific features of the invention herein described, and all statements of the scope of the invention which as a matter of language, might be said to fall therebetween.

Now that the invention has been described, what is claimed is:

1. A portable illuminated sign assembly of the type primarily designed to be hand-carried when not in use, said assembly comprising:
   (a) a base formed from a substantially flexible material and including a display face, said base structured to be folded upon itself and selectively positionable between an open and a closed position,
   (b) said base comprising a substantially hollow interior portion defined at least in part by oppositely disposed and spaced apart side panels,
   (c) indicia means mounted on said display face for representation of a display thereon, and structured for visual distinction from a remainder of said display face,
   (d) illumination means mounted on said base and disposed and configured to accentuate said indicia means relative to and distinguished from said display face and enhance visual observation of said indicia means,
   (e) said indicia means comprising a plurality of indicia segments disposed in substantially spaced relation to one another on said display face, said illumination means comprising a plurality of illumination segments each correspondingly configured in conformance with a respective indicia segment and disposed to illuminate said respective indicia segments,
   (f) circuit means removably disposed in part within said interior portion and structured for electrical interconnection of said illumination segments with one another and a power source,
   (g) said illumination segments comprising a plurality of light bulbs electrically connected to said circuit means and disposed in spaced relation to one another to define a plurality of electrically interconnected and independently configured arrays, each array correspondingly configured to one of said indicia segments, whereby said indicia means is effectively outlined in illumination,
   (h) said base further comprising an aperture means integrally formed in said display face for visual observation of said illumination means, said aperture means comprising a plurality of apertures correpondingly configured to said indicia segments and disposed in aligned relation therewith; each of said plurality of light bulbs disposed in registry with one of said plurality of apertures and extending therethrough for visual observation of said display face,
   (i) said illumination means further comprising a mounting means structured for connection and orientation of said plurality of light bulbs into respective ones of said arrays, said mounting means formed from at least partially rigid material and configured to substantially correspond to each of said indicia segments,
   (j) said mounting means being formed from electrically conductive material and being disposed and structured to electrically interconnect said plurality of light bulbs of each array with said circuit means, and
   (k) connecting means structured for support of said base in said open position for visual observation of said display face.

2. An assembly as in claim 1 wherein said plurality of apertures are configured to correspond to said indicia segments and are disposed in spaced relation to one another corresponding to spacings of said light bulbs of said illumination segments, each of said light bulbs extending through a correspondingly disposed aperture to project outwardly from said display face in illuminating relation to a respective one of said indicia segments.

3. An assembly as in claim 2 wherein said closed position is defined by substantially overlying relation of adjacent portions of said display face and substantially nested relative orientation between said light bulbs of respective illumination segments of said adjacent portions.

4. An assembly as in claim 1 wherein said mounting means comprises a plurality of mounting segments, each formed of conductive material and structured to electrically connect said light bulbs of each segment with said circuit means, each of said mounting segments being formed of bendable and at least partially rigid material for orientation into a corresponding configuration to a respective indicia segment.

5. An assembly as in claim 4 wherein said circuit means is structured to electrically interconnect each of said illumination segments and, through attachment with said mounting segments, electrically interconnect each light bulb of said respective illumination segment.

6. An assembly as in claim 1 further comprising access means formed in said base for providing access to said hollow interior portion, a closure assembly secured adjacent said access means and structured to selectively close-off access to said interior portion.

7. A portable illuminated sign assembly structured to be hand-carried and selectively positionable from said carried position to an open, display position, said assembly comprising:

(a) a base formed from a substantially flexible material and including a display face, said base capable of being folded upon itself and selectively positionable between an open and a closed position, said base further comprisng a substantially hollow interior portion defined at least in part by oppositely disposed and spaced apart side panels, (b) indicia means mounted on said display face for representation of a message thereon, and structured for visual distinction from a remainder of said display face, (c) illumination means mounted on said base and disposed and configured to accentuate said indicia means relative to and distinguished from said display face and enhance visual observation of said indicia means, (d) circuit means structured for electrical interconnection of said illumination means with a source of power and removably mounted within said hollow interior portion of said base in isolated relation to said display face, (e) said indicia means comprising a plurality of indicia segments disposed in substantially spaced relation to one another on said display face; said illumination means comprising a plurality of illumination segments, each correspondingly configured in conformance with a respective indicia segment and disposed to illuminate said respective indicia segments, (f) each of said illumination segments comprising a plurality of light bulbs electrically connected to said circuit means and disposed in spaced relation to one another to define a plurality of electrically interconnected and independently configured arrays, each array correspondingly configured to one of said indicia segments, whereby said indicia means is effectively outlined in illumination, (g) said base comprising an aperture means integrally formed in said display face for visual observation of said illumination means, said aperture means comprising a plurality of apertures correpondingly configured to said indicia segments and disposed in aligned relation therewith; each of said plurality of light bulbs disposed in registry with one of said apertures and extending therethrough for visual observation of said display face, (h) access means formed in said base for providing access to said hollow interior portion, a closure assembly secured adjacent said access means and structured to selectively close-off access to said interior portion, (i) said closed position being defined by substantially overlying relation of adjacent portions of said display face and substantially nested relative orientation between said light bulb of respective illumination segments of said adjacent portion, and (j) connecting means structured for support of said base in said open position for visual observation of said display face.

8. An assembly as in claim 7 wherein said light bulbs of each illumination segment protrude from said display face a substantially equal amount and saod light bulbs projecting from respective ones of said adjacent portions of said display case extending in opposite directions.

9. An assembly as in claim 7 further comprising compartment means structured and disposed for storage of a portion of said circuit means extending outwardly from said interior portion of said base.

10. An assembly as in claim 7 wherein said connecting means comprises a handle assembly secured to said base and disposed to extend outwardly therefrom in supporting relation thereto when said base is in said open position and said closed position.

11. An assembly as in claim 7 whereas the connecting means comprises a magnet attaching structure secured to said base and disposed for attachment thereof to a metallic surface when said base is in said open position.

12. An assembly as in claim 6 wherein said access means comprises an opening formed along and at least partially defined by correspondingly disposed peripheral edges of said side panels, said closure assembly mounted adjacent said peripheral edges and structured for attachment there between and selectively opening and closing thereof.

* * * * *